United States Patent
Martino et al.

(10) Patent No.: US 6,216,102 B1
(45) Date of Patent: *Apr. 10, 2001

(54) NATURAL LANGUAGE DETERMINATION USING PARTIAL WORDS

(75) Inventors: Michael John Martino; Robert Charles Paulsen, Jr., both of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 08/723,815

(22) Filed: Sep. 30, 1996

Related U.S. Application Data (63) Continuation-in-part of application No. 08/699,412, filed on Aug. 19, 1996.

(51) Int. Cl.[7] .............. G06F 17/28; G06F 17/21
(52) U.S. Cl. .............. 704/9; 704/1; 707/536
(58) Field of Search .............. 704/1–2, 5, 8–9, 704/10; 707/530–532, 536

(56) References Cited

U.S. PATENT DOCUMENTS

| | | | |
|---|---|---|---|
| 4,674,066 | * 6/1987 | Kucera | 704/10 |
| 4,773,009 | * 9/1988 | Kucera et al. | 704/9 |
| 5,490,061 | * 2/1996 | Tolin et al. | 704/2 |
| 5,548,507 | * 8/1996 | Martinoi et al. | 704/1 |
| 5,671,426 | * 9/1997 | Armstrong, III | 704/4 |

\* cited by examiner

Primary Examiner—Forester W. Isen
Assistant Examiner—Patrick N. Edouard
(74) Attorney, Agent, or Firm—Jeffrey S. LaBaw (57) ABSTRACT

Comparing the short and truncated words of a document to word tables of most frequently used words in each of the respective candidate language to identify the language in which the document is written. First, a plurality of words from a document is read into a computer memory. Then, words within the plurality of words which exceed a predetermined length are truncated to produce a set of short and truncated words. The set of short and truncated words are compared to words in a plurality of word tables. Each word table is associated with and contains a selection of most frequently used words in a respective candidate language. Although the most frequently words in most languages tend to be short those which which exceed the predetermined length may be truncated in the word tables. A respective count for each candidate language each time one of the set of short and truncated words from the document matches a word in a word table associated with the candidate language. In some embodiments, the count may weighted by factors related to the frequency of occurrence of the words in the respective candidate languages. The language of the document is identified as the language associated with the count having the highest value.

18 Claims, 5 Drawing Sheets

NATURAL LANGUAGE DETERMINATION USING PARTIAL WORDS

This application is a continuation in part of copending, commonly assigned application entitled "Word Counting for Natural Language Determination", Ser. No., 08/699,412 filed Aug. 19, 1996 by the same inventors which is hereby incorporated by reference.

BACKGROUND OF THE INVENTION

The subject invention relates generally to human language recognition technology. More particularly, the invention relates to a technique for identifying the language used in a computerized document.

Computers and computer networks have intensified the transmission of coded documents between people who speak and write in different natural languages. The internet has recently accelerated this process. This results in several problems. In the prior art, for example, when an electronic document was sent across national boundaries, computer system operations were interrupted so that a human being could determine the natural language of a received document before a given operation such as selecting, displaying, printing, and so forth which may be dependent upon the peculiarities of an given natural language. In the context of an internet search, unless the user is multilingual, he is likely to be interested only in the retrieved documents in his native language, or at any rate, only those languages he reads.

The invention described herein eliminates the need for such human intervention by automatically determining the correct natural language of the computer recorded document.

Prior to the applicants' own contributions to the art, the general problem was recognized in the prior art. In the area of automated language identification of coded text, the prior art used n-gram character based systems, which handle each character multiple times, a process which consumes a great deal of system resource when compared to the applicants' word-based technique described below. In speech recognition systems, language recognition uses language and speech characteristics, e.g., trigrams or emphasis which require large amounts of text to be parsed and measured, and large amounts of time for processing. These techniques are based on some form of matching algorithm based on language statistics that are not meaningful in a linguistic context.

Prior systems using trigrams, n-grams, and other artificial divisions in a computerized text are not considered reliable, and they are very slow and consume considerable computer time, as they handle each character multiple times for a document., e.g., each document character appears in three different trigrams. Characteristics measured, or derived from, but which are not actual components of written languages such as trigrams or letter sequences, have limited success in identifying the correct language, and require large amounts of text to be parsed and measured. Similarly, prior systems which depend on the attributes of individual characters and their local contexts are also limited when applied to the problem of identifying a language.

In the invention described herein, none of the prior art techniques, e.g., classifying language by signal waveform characteristics, trigrams, n-grams, or artificial divisions of written language, were used. In both inventions, words are read from a computer document and compared to predetermined lists of words selected from a plurality of languages of interest. The word lists comprise relatively few of the most commonly used words in each language; statistically, a significant percentage of all words in any document will be the most common words used in its language. The language or genre of the document is identified by a process that determines which language's word-list most closely matches the words in the document.

In the parent application, the applicants have taught that the closeness of match can be determined by the sum of the normalized frequency of occurrence of listed words in each language or genre of interest. Each language's word-list and the associated frequency of occurrence for each word in the list is kept in a word table. The word table is linked with a respective accumulator whose value is increased each time a word from an inputted document matches one of the common words in one of the tables. The process adds the word's normalized frequency of occurrence, as found in the word table, to the current sum in the accumulator associated with the respective language. When processing stops, the identified language is the language associated with the highest-valued accumulator. Processing may stop either by reaching the end of the document or by achieving a predetermined confidence in the accumulated discrimination.

However, the applicants have taught that weighting in the accumulation process is less preferred and that it can be eliminated if the actual frequency of occurrence of words in each of the candidate natural languages can be established and the word tables have a substantially equivalent coverage of the respective candidate languages assembled.

The present application is an improvement of the basic invention of word counting for natural language determination to allow the language identification in the most efficient and expeditious manner.

SUMMARY OF THE INVENTION

It is therefore an object of the invention to identify the natural language in which a computer stored document is written from a plurality of candidate languages in a most efficient manner.

It is another object of the invention to identify in which of several pre-specified natural languages a given body of text is written.

It is another object of the invention to provide a mechanism which is very, very fast.

It is another object of the invention to minimize the memory requirements.

It is another object of the invention that the memory requirements are fixed regardless of the number of words stored.

These objects and others are accomplished by comparing the short and truncated words of a document to word tables of most frequently used words in each of the respective candidate language to identify the language in which the document is written. First, a plurality of words from a document is read into a computer memory. Then, words within the plurality of words which exceed a predetermined length are truncated to produce a set of short and truncated words. The set of short and truncated words are compared to words in a plurality of word tables. Each word table is associated with and contains a selection of most frequently used words in a respective candidate language. Although the most frequently words in most languages tend to be short those which which exceed the predetermined length may be truncated in the word tables. A respective count for each candidate language each time one of the set of short and truncated words from the document matches a word in a word table associated with the candidate language. In some embodiments, the count may weighted by factors related to the frequency of occurrence of the words in the respective candidate languages. The language of the document is identified as the language associated with the count having the highest value.

The speed of language determination by this invention is very fast, because only a relatively small number of words need to be read from any document to reliably determine its language or genre. All languages can be processed in parallel in hardware at commensurate hardware speeds, as opposed to software speeds. The basic operations required within the hardware are far simpler, hence intrinsically faster, than their software equivalents.

Further, an advantage of the present invention is that only a few words, e.g., 25–200, need be contained in the word table for each candidate language of interest, so that in practice each word is tested against only a relatively small number of words for reliable language recognition. In the hardware embodiment, there is no comparison between words performed. Each word is used as an address into a bit table (set of tables) and the address either contains all "1" bits or not. There is no comparison operation. As discussed below, it is important that the words selected for the word frequency tables for each language cover a commensurate percentage of the frequency of occurrences in their respective languages.

DETAILED DESCRIPTION OF THE DRAWINGS

In this specification, the term "language" means a natural language, i.e. human language, used for human communications, e.g., English, French, Spanish, German, and so forth. The term "language", as used in the claims, also applies to "genres" within a natural language. Genre is defined herein as a distinctive style of use of a language in some specific context. For example, genre within English includes technical writing, business writing, legal writing, medical writing, fiction, and many others. Thus, genre applies to different variations of the same language involving different styles and manners of word use within a natural language which are reflected in coded documents, and may involve a distinctive use of standard words in a language or may add new words to a language. Genre may reflect particular jargons and dialects of a language such as High German, Low German, and Swiss German, or as London English and New York English.

Ideographic languages such as Japanese, Chinese and Korean can be handled by this invention in a computer mechanism by choosing an appropriate internally-coded representation for the ideographs, such as the double-byte codes used for such languages in computers today. Thus, the mechanism of this invention can be applied to any language having coded words, without regard to the alphabet or word form required for the human-readable printed symbols used for the respective languages.

Generating the Word Tables

In one preferred embodiment, the word tables are the result of reference to scholarly works in which a large sample of words from the respective candidate languages have been counted. Once the word tables have been constructed, the actual determination of the language of an incoming computer document can begin in either the simple counting, weighted or mixed identification methods described below. The word tables can simply be a list of the most common words or may include weights associated with the most common words. The weights can be computed in a variety of ways, although the applicants presently believe that the most preferred weight is as closely representative of the actual frequency of occurrence of the word in the language as possible. One particularly preferred method of storing the words is disclosed below.

Ser. No. 08/699,412 incorporated by reference above cites many scholarly references from which the word tables can be derived. Table 1 below demonstrates why relatively few words are required to be in a word table. The data for Table 1 are taken from Computational Analysis of Present-day American English by H. Kucera and W. N. Francis and published by the Brown University Press, Providence, R.I., 1967. It lists the twelve most common words in written English in MEASURED FREQUENCY order from top to bottom. The MEASURED FREQUENCY is stated as the average count for each common word per 100 words used in the (written) English language, determined over the total word count in a very large number of English documents. It is therefore the percentage of cases that a word randomly selected from a representative sample of written English text will be that particular word. MEASURED FREQUENCY is equivalent to frequency of occurrence, as that term has been previously used herein. Each CUMULATIVE FREQUENCY in Table 1 is the sum of the MEASURED FREQUENCIES for all words in the table from that point and above. For example, the CUMULATIVE FREQUENCY of 20.307 is shown with the word "in" in TABLE 1 and represents a plurality of common words comprising the six most frequently used words in the English language (i.e. the first six words: "the", "of", "and", "to", "a", and "in" in Table 1). The CUMULATIVE FREQUENCY of 20.307 is therefore derived by adding the MEASURED FREQUENCIES for these six words. Thus, in a representative sample of written English text, approximately 20% of the words in the text will be one of the first six words in Table 1; fully 26% will be one of the 12 words in the table. Thus, relatively few words represent a substantial portion of representative text. Similar tables showing similar statistics can be constructed for other languages.

TABLE 1

| The Twelve Most Common English Words | | |
|---|---|---|
| WORD | MEASURED FREQUENCY | CUMULATIVE FREQUENCY |
| the | 6.899 | 6.899 |
| of | 3.590 | 10.489 |
| and | 2.845 | 13.334 |

TABLE 1-continued

The Twelve Most Common English Words

| WORD | MEASURED FREQUENCY | CUMULATIVE FREQUENCY |
|---|---|---|
| to | 2.578 | 15.912 |
| a | 2.291 | 18.203 |
| in | 2.104 | 20.307 |
| that | 1.045 | 21.352 |
| was | 0.995 | 22.347 |
| he | 0.968 | 23.315 |
| for | 0.941 | 24.256 |
| it | 0.936 | 25.192 |
| with | 0.863 | 26.055 |

Language statistics, such as those shown above in Table 1, show that the words which are most common in a language are the most useful in making a language identification. The definition of a common word in a language is that it is a word that is used frequently in that language. As a result, common words from a language will appear in essentially all written communication; hence the process of this invention will find them.

Normalization or other efforts to make the frequencies in the word tables equivalent may be required because the sample sizes may be different from one language reference to the next, the sample sizes may be unknown, or the lists of the most common words taken from the samples may be different cumulative amounts of the different languages. Where one does not have the same amount of information of the same type for each language, normalization is generally a good idea. Where equivalent information is available for all of the candidate languages, normalization is not required. Ser. No. 08/699,412 incorporated by reference above discusses normalization techniques which can be used to construct the word tables. The present invention is primarily concerned with improved methods of storing and using the word tables once they have been constructed.

When preparing word tables for the simple word counting embodiment, it is not necessary to include weighting factors in the actual word tables as they are not used. In the simple word counting embodiment, described below, counting each occurrence of the common words selected for the word tables for each language is generally sufficient for discrimination among the candidate languages, rather than using weighted values for the words as taught in the parent application. Of course, the weights themselves add little additional storage requirement and if present in a word table, need not be used for simple counting. Alternatively, one could view the "weights" as being set to a constant value which will typically be 1.0. In the preferred method of storage detailed below, "simple counting" as described in the parent application is used to identify the candidate language. In fact, in this method of storage, it is difficult to associate weights with individually stored words.

To compute a word table for the n most frequently occurring words in a given language or genre where the actual frequency of the words within the language is known, the following method can be used:

Step 1: Compute the total number of occurrences for each of the most common n words in each of the languages under consideration.

Step 2: Place each of the most frequently occurring words in each of the languages in the Word Frequency Tables and set the weight to 1 for each of the words.

Figure 3:
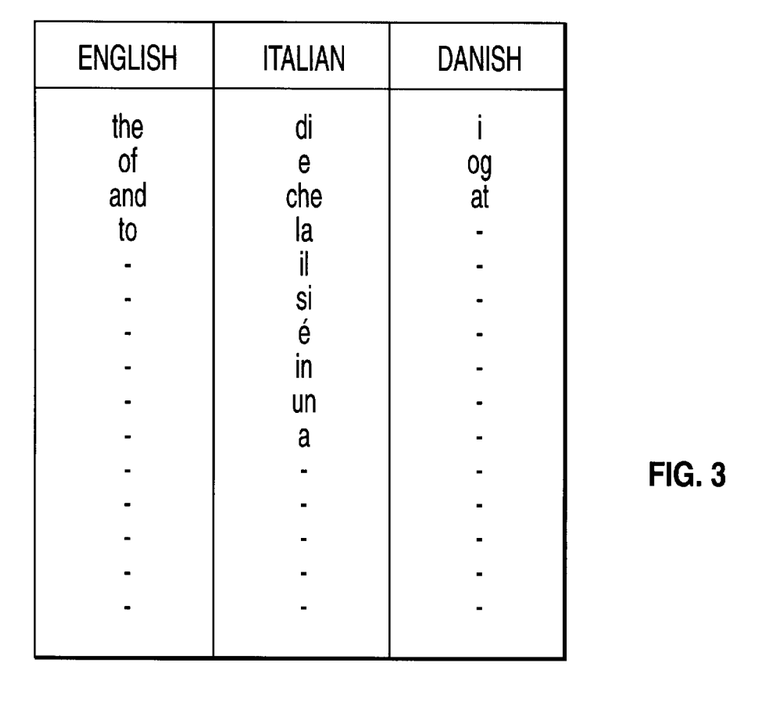
FIG. 3 is an example of a word table containing a set of common words in a plurality of candidate languages.

Thus, the frequencies of occurrence in the simple counting method are merely used to set up the word lists in the word table to assure that the words in each have a substantially equivalent coverage of each of the candidate languages. FIG. 3 depicts portions of word tables for English, Italian and Danish. Note that no weighting factor is included in the tables. For example, in English, 46 words are adequate to give an approximate 40% coverage, whereas in Italian, 148 words are needed.

As an alternative to the scholarly sources discussed above, the word frequencies for the words in each language or genre of interest may alternatively be determined by having a data processing system count the words in a large number of documents in an environment in which the invention is to be used. This approach may be more useful than using the listed sources when the particular environment mixes jargon, or colloquialisms, in one or more of the languages of interest, which often occurs, or if one is attempting to distinguish different genre in the same language.

A weighted word table for the n most frequently counted words in a given language or genre can be computed. As discussed above, where the actual frequency of the words within the language cannot be reliably determined, the following method can be used:

Step 1: Determine a divisor. This is either the sample size, if known, or the sum of the counts of the n words in each word list.

Step 2: For each of the n words in each of the word lists for each of the given languages, divide its measured frequency of occurrence by the divisor from Step 1. Call this value the Normalized Frequency of Occurrence (NFO).

Step 3: Associate each Normalized Frequency of Occurrence (NFO) with the respective word in the Word Frequency Tables.

As above, in the description of preparing a word table for the simple counting method, there may be more words in the word table for one candidate language than in the word table for another candidate language and one or more most common words may be excluded in a given word list to obtain equivalent coverage over all word tables.

As a variation on the invention, any of the word tables may also contain a sampling of words unique to the same language or genre which may have a relatively low frequency of use in the language of the respective table. Use of unique words may be especially helpful in distinguishing among genre.

The overall effect of these language statistics is that an examination of about 100–200 words from a document in an unknown language using the method of the present invention with the 25–200 most common words the in each of the candidate languages is ordinarily sufficient to determine the language of the document accurately. In the general case, the applicants try to achieve approximately 40 percent coverage of the language in the respective word tables. This can usually be achieved with fewer than 200 selected common words.

Language Identification

The preferred embodiment of the present invention is the combination of a novel computer program executing in a conventional data processing system. Alternatively, the invention may be embodied in special purpose data processing hardware (not shown) which has separate comparator controls for operating with tables embedded in special storage hardware. In the preferred embodiment, which the applicants call the simple word counting embodiment, the measured or counted frequencies of occurrence are used to assemble the tables but not used as the weights for accumulation purposes. As described below, the effect of simple counting is to replace the weighted accumulation process as initially proposed by the applicants by a counting method in which the values built up by the processing in the different language accumulators are in fact the counts of the number of occurrences of the common words in the word tables of each of the candidate languages.

An alternate embodiment, called the mixed counting embodiment, uses some combination of simple counting and weighted counting. In a sequential pass embodiment, it will try simple counting first, and if the determination is inconclusive, will use weighted frequency data to attempt to perform a better discrimination. Simultaneous simple and weighted counting is also possible. If the discrimination does not reach some predetermined level of confidence in one counting method, the results from the second counting method can be evaluated. This embodiment may be useful where the input document whose natural language is to be determined is very short.

Among the advantages associated with the simple counting method are the simplification of data collection, in that simple counting of relatively small amounts of text will provide the word lists that are needed, and the ease of implementing the method in hardware and software, and elimination of the normalization requirement. Counting in hardware, that is, incrementing by 1 under one or more specified conditions, is fundamental to computing machines.

Figure 1:
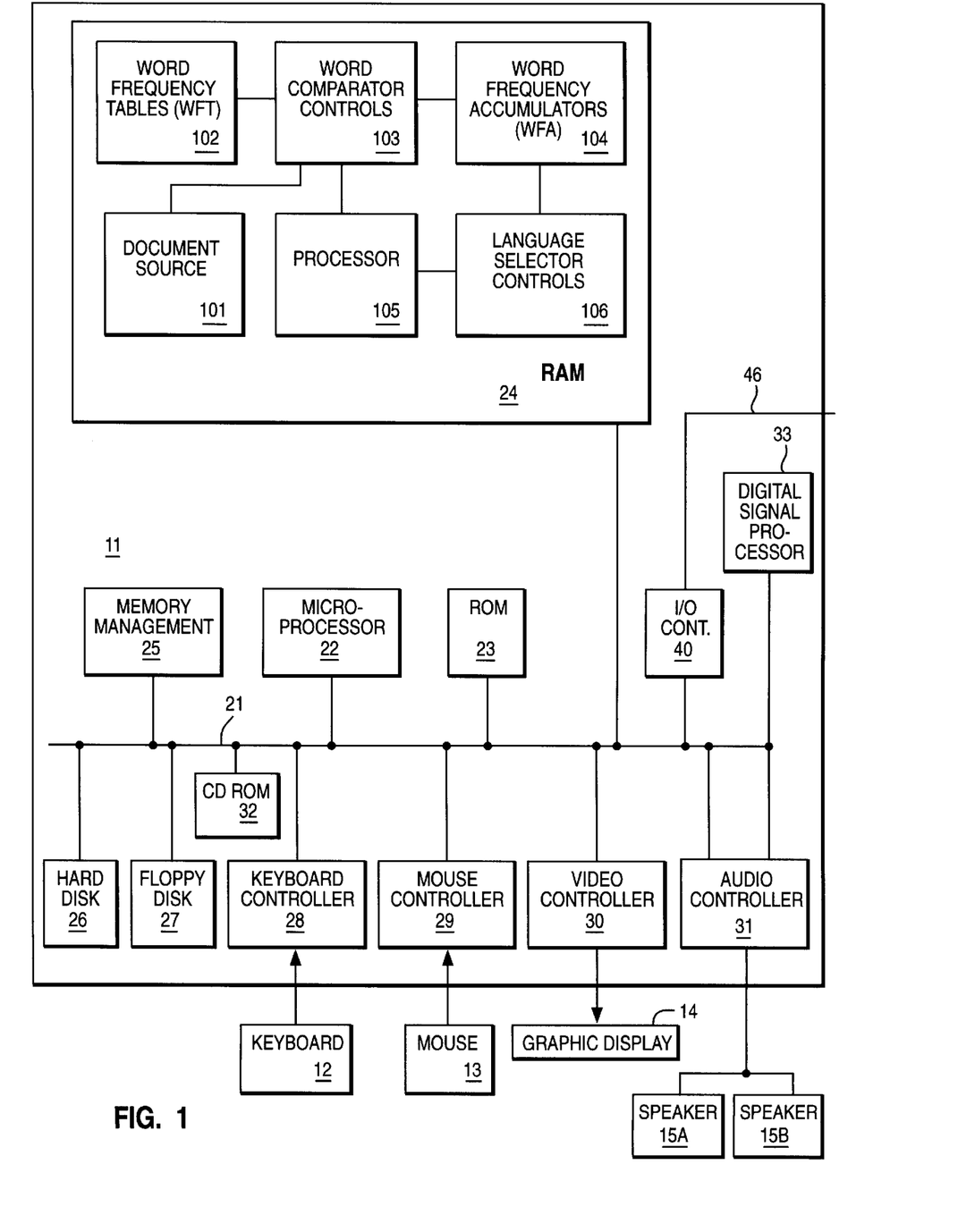
FIG. 1 is a functional block diagram of the current invention, a general data processing system containing data and controls for determining the language of a document.

FIG. 1 shows an overall block diagram of a general system configuration supporting an embodiment of the invention. It contains components which may be formed of hardware and/or software components in the system. The invention may be run on a variety of computers or collection of computers under a number of different operating systems. The computer could be, for example, a personal computer, a mini computer, mainframe computer or a computer running in a distributed network of other computers. Computers in the IBM PC series of computers could be used in the present invention running on the IBM OS/2 Warp 3.0 operating system. Again, the hardware requirements are very modest. The hardware embodiment could be implemented in an Intel 8086 processor with 16 KB of memory, probably less.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 101–106 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. The program may also be stored in the memory of another computer system to be sent over the network or an external network such as the Internet when desired. One skilled in the art would appreciate that the physical storage of the sets of instructions physically changes the medium upon which it is stored or transmitted electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of comparing or identifying, or other terms that could be associated with a human operator. No action by a human operator is desirable in any of the operations described herein which form part of the present invention; the operations are machine operations processing electrical signals to generate other electrical signals.

As described herein, the invention applies for any language or genre using an alphabet without regard to the printed symbols used for that language. As a computer document, all such symbols are processed as binary codes in a computer machine, rather than human readable symbols.

The data and logic blocks in RAM 24 are now discussed in greater detail. Coded data input is provided from a Document Source 101, which provides coded characters representing text of a document generated by using words of any human language. Before resident in RAM, document source 101 may be provided by an optical character reader reading the coded characters from a hard copy of a document. Alternatively, source 101 may be coded characters read from a soft copy of a document stored in an internal storage, e.g., floppy disk, tape or compact disk of the system, or source 101 may originate as coded characters transmitted on a network to the data processing system from some remote location using a similar system reading the document from one of its terminals or peripheral devices.

Each of the word table 102 is associated with a respective language which can be detected as the language of source document 101. The construction of the word tables is as set forth above. In the pure counting method, weights such as the actual or normalized frequencies of occurrence are not required in the word tables. In the weighted or mixed embodiments, the weighting factors, whether actual or normalized frequencies of occurrence or other weights, must be present in the word tables for each word. The set of particular languages represented by tables 102 are called herein the languages of interest, or candidate languages. A language not represented in tables 102 cannot be detected as the language of the incoming document source 101.

The text from the source 101 is provided in variable-length word units to the comparator 103. In a hardware embodiment, the comparator can be part of a processor. Comparator controls 103 compare each variable length word received from source 101 with words in a plurality of language word tables 102. As discussed in preferred embodiments below, words of different length are stored in different word tables. Thus, in these embodiments it would make sense to compare only those words of the same length to the words in the appropriate word table.

Each word received from document source 101 is compared by the comparator 103 with the words in the tables 102. The comparator 103 determines an equal or unequal condition between each inputted document source word and each table word read from the word tables 102. The words in each of the plurality of the word tables 102 may be scanned until all words in all of the tables 102 are compared by the comparator 103.

In simple counting, wherever a word from a document matches a word in hard table an accumulator associated with the respective candidate language is incremented by one. In the mixed counting embodiment, a plurality accumulator 104 may be associated with a candidate language, each for one word in the language's word table. Thus, simple counts and weighted counting can be performed concurrently merely by multiplying the accumulated counts for each word by the appropriate weight, rather than incrementing by the weight as the words match.

When weights are used, whenever a word in any word table 102 is found to compare or equal to a source document word, the weight or the frequency value associated with the word is read out by the processor 105. Then, that frequency value is transferred by the processor 105 to a language-associated accumulator of a plurality of accumulators 104 which is the accumulator associated with the language of the table having the current word with the compare-equal condition and called an accumulator. Each frequency value received by an associated accumulator 104 is added to (accumulated with) whatever sum currently exists in the respective accumulator. *111

The compare processing stops when the source words top being inputted. This may occur when the document source 101 reaches the end of the current document or reaches a predetermined number of words, i.e. some minimum number of words are supplied by the document source 101 or when the highest-valued accumulator 104 exceeds the next highest-valued accumulator 104 by a predetermined amount or factor. This is discussed below in connection with step 155 in greater detail.

After the compare processing stops for a document source 101, the language selector process 106 is queried by the processor 105. The language selector process 106 accesses all accumulated values in all accumulators 105 and determines which accumulator contains the highest value.

The language associated with the accumulator containing the highest value is outputted by the language selector 106 as the identified language. An alternate embodiment, called the mixed counting embodiment, uses some combination of simple counting and weighted counting. In a sequential pass embodiment, it will try simple counting first, and if the determination is inconclusive, will use weighted frequency data to attempt to perform a better discrimination. Simultaneous simple and weighted counting is also possible. If the discrimination does not reach some predetermined level of confidence in one counting method, the results from the second counting method can be evaluated. This embodiment may be useful where the input document whose natural language is to be determined is very short.

A plurality of accumulators 105 are respectively associated with each language's word table. That is, each language has an associated word table and at least one associated accumulator. Thus, a word table and accumulator is thereby provided for each language of interest. The associated language is recorded with each accumulator and each word table. All of the accumulators are reset to a zero value by initialization step 152 prior to inputting words from a document source 101 to the process in FIG. 1 or FIG. 2. In some embodiments of the invention, a plurality of accumulators is associated with each word table, one for each word. This allows simultaneous weighted or simple counting in one mixed embodiment as the counts for each word can be multiplied by the respective weight or simply counted on a word per word basis. This is useful since the system does not always know the size of the target document. As mentioned above, weighted counting is felt to have the most use when the document is short. Thus, in one mixed counting embodiment, weighted counting is used until a predetermined number of words are compared. Thereafter, simple counting is used. By accumulating the word counts separately, the comparison process does not need to be reinitialized for a second pass through the document.

During processing, each accumulator is incremented according to the common words in each language found in the document. In the simple counting method, an accumulator contain a pure count of the common words.

In the weighted and mixed embodiments, each accumulator contains a running total of the weights of the common words in the source document which match a common word in the associated word table for the same language. For each match of a word in the source document with a word in any of the word table, i.e. one or the weight, for that word is added to the total for that language in the associated accumulator.

Hence, each accumulator sums the matches or the weights for inputted words having matches in the associated word table. A match occurs when a source word from an inputted document is found equal to a word in the associated word table. After reading is ended for an inputted document, the language assigned to the accumulator having the highest value of all accumulators is thereby declared by the process as the identified language of the document.

Figure 2:
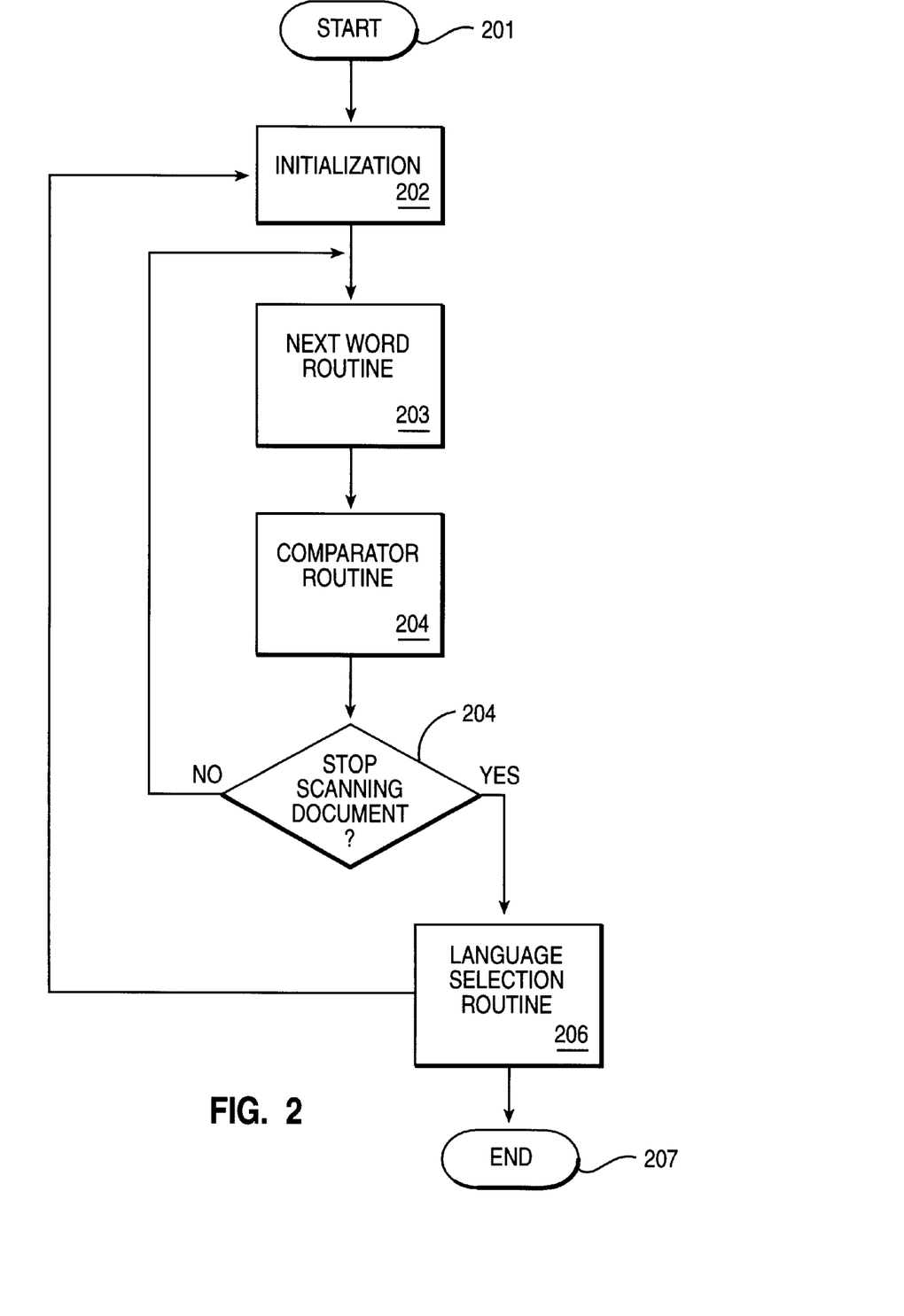
FIG. 2 is a flow chart of the sequence of general steps carried out in the process performed by the system shown in FIG. 1.

The process in the flow chart of FIG. 2 shows the general sequence of steps by which a document is processed and its language determined. The process is described here without reference to the use of unique words.

Each of steps 151, 152, 153, 154, 155, 156 and 157 operates under control of a processor in the data processing system. Step 152 provides initialization of a data processing system for executing the invention using word tables and accumulators for the languages of interest. Step 152 loads the word tables and accumulators into the system main memory from a storage medium, on which they were stored after they were previously prepared, and their addresses in main memory are passed to the process in FIG. 2 for use in its execution. This step also sets the accumulators to a zero state. Step 153 parses the document into its constituent words, i.e. the first word and a sequence of following words. Each word from the source document which is having its language determined is transferred to the comparison process in step 154. The first word need not be the actual first word in the document, and it may be located anywhere in the source document, and it is generally the first text word after any non-text data in the source document. Non-text data will generally be skipped in the sequence of data provided to the process in FIG. 2.

Step 154 compares each source word with the common words in word tables. In the weighted and some embodiments, step 154 reads out the weights associated with each matched common word. Step 154 adds one in the case of the simple counting method and the weight in the weighted counting method to the current sum in the accumulator associated with the word table.

Step 155 determines when to stop processing a document. This may be when any of the following conditions are detected:

1. The entire document is read and all words compared to the word tables. This may be determined by recognizing an end-of-document signal, by knowing the size of the document and tracking the amount of text processed, by sensing that a time has expired during which no input has been received as an indication of the end of a document, or by relying on the data processing system's file-processing subsystem to report end-of-file.
2. A predetermined number of words from the document have been processed. It has been found that only a hundred words or so may be needed from a document to identify its language. Thus, all words in a large document need not be read and processed by the subject invention.
3. After some minimum number of words are processed, a predetermined factor or, alternatively, difference, between the highest-valued and the next-highest-valued accumulator is achieved. It has been found that once the accumulators diverge, it is extremely unlikely that additional processing will result in the then-highest-valued accumulator being exceeded by another accumulator when the entire document is processed.

Step 156 is entered after the end of document is sensed by step 155. Step 156 compares the values in all of the accumulator and finds the accumulator having the largest value. Step 156 outputs the language name content of the language field associated with the accumulator having the largest value to determine the identified language. In the case of the sequential pass mixed embodiment, it also includes a test to determine whether the specified amount of discrimination has been achieved. If not, the process returns to step 152 to be initialized for the second weighted counting pass. This process is described in greater detail in Ser. No. 08/699,412 which was incorporated by reference above.

Word Storage Table for Natural Language Determination

As discussed above, this invention relates to several means that have been disclosed for the purposes of identifying the natural language, e.g., English, French, Dutch, in which a given unit of text is written. In particular, a method is disclosed that can be used to store the dictionary of frequently occurring words in each of the individual languages to be recognized.

The advantage of the storage method is that it allows storage of the dictionary words in a relatively small and fixed amount of memory. The storage size does not grow as a function of the number of words added to the dictionary. That is, words may be added to the dictionaries, up to a point, without increasing the storage required. For a hardware implementation, the invention will provide single cycle access to determine if a word is stored in the tables. The size invariant nature of the storage requirement is particularly important for hardware implementations as it allows for some dictionary growth without a concomitant hardware increase. It is believed that these advantages will make this method of storage useful in a wider range of applications than the particular one discussed here. Some of these applications are discussed below.

One important feature of this invention is the internal representation of the word frequency tables in such a way that the advantages listed above are achieved.

The method of storing the word frequency tables provides for sufficient discrimination given that the most common words in the languages are used. In such a case, for each word in each of the word tables associated with each of the languages under consideration, the "weights" can be considered as set to a constant value of 1.0, and the accessing of the word tables is different. In fact, weights can be used when the word tables are stored according to this method. A counting method is used in which the values built up by the processing in the different language accumulators are the counts of the "matches" of the common words stored in each of the languages under consideration. As discussed below, some of the matches are in fact aliases, i.e. words other than the common words, which occur in the document under consideration.

According to the invention, the basic unit of word storage is an n×n bit table, where each bit represents a given letter pair at a particular place in a word in one of the languages under consideration. The basic table for English, prior to initialization, looks like this:

|   | A | B | C | ... | Z |
|---|---|---|---|-----|---|
| A | 0 | 0 | 0 |     | 0 |
| B | 0 | 0 | 0 |     | 0 |
| C | 0 | 0 | 0 |     | 0 |
| Z | 0 | 0 | 0 |     | 0 |

In the preferred embodiment, the blank, apostrophe or hyphen are not considered as characters. In certain alternative embodiments, it may be useful in certain situations to do so. For example, foreign languages which make significant use of special characters, such as the French and Italian which use the apostrophe heavily as compared to English. When word tables are used to store words of different lengths a blank character is necessary to store the shorter words. For example, if the word "in" were to be stored in a 3 letter word table, a blank character would be inserted after "in".

This storage method can be implemented in software and firmware as well as hardware. However, since most software addressing is on a byte basis rather than a bit basis it is doubtful that the software embodiment will approach the speeds possible in hardware. However, with clever reusable threads using a multiprocessor system, it may be possible.

To store a word of n letters requires the use of $$(i=1 \text{ to } (n-1)) \text{ SIGMA } i, \text{ for } n \geq 2$$

such tables. To store words of 2 letters, one table is required. Storage of 3 letter words requires 1+2 or 3 tables. To store a words of 5 letters requires the use of 10 such tables (1+2+3+4). The applicants have observed that the most common words in languages are the shortest, hence it will be a rare language that will have many common words with more than 6 letters.

However, there are languages whose common words will tend to be long, e.g., Hawaiian. In an alternate embodiment the entire word is not stored, but only an abbreviation of the word. The abbreviation preferably will be constant for all words, e.g., the first four or five letters. In English, for example, among the first 96 most common words, only two are longer than five letters, "before" and "through". For Italian, of the 148 most commonly occurring words representing roughly 40% of written Italian, only 16 have 6 letters and one has 7 letters. The words are:

"allora," "ancora," "essere," "giorno," "grande," "perche*," ""quando," "quanto," "quella," "quelle," "quello," "questa," "questi," "questo," "sempre," "stesso," and "qualche."

The * means there is an accent over the final "e" of "perche" that may will not display correctly on a terminal.

Taking only the first five letters would cause "quella," "quelle," and "quello," to be counted as one word and similarly for "questa," "questi" and "questo." This form of aliasing, which in the invention is called "weak aliasing", is where one or more words masquerades within the word storage tables as another word from the same language. Weak aliasing is not a problem for the invention. Longer words may be truncated and be counted as having the same five letters unless the system were programmed to take only words of a certain length. Thus, other words which are not the most common words would also be counted. Counting "quella" for "quelle" does not matter so long as it is counted for the same language. The second kind of aliasing, is called strong aliasing, where a word or its abbreviation in one language masquerades in the word storage tables as a word from a different language can be a problem. For example, if the high frequency word "das" occurs in candidate language 1 (German) and masquerades in candidate language 2, (French) then the word count for candidate language 2 will be incorrectly biased larger than it actually was by the strong aliasing of "das".

Aliasing, for the dictionary words, both weak and strong, is easily detected by processing the word tables against each other and examining the output for incorrect sums. If candidate languages 1 and 2 have m words in common, e.g., "in" which occurs in many Indo-european languages, when the dictionary for 1 is processed through the recognizer against 2, there should be a count of m words recognized; exactly the ones which are common to both languages. The same result should be obtained for language 2 processed through the recognizer against language 1. If the result is greater than m, then strong aliasing has occurred. Strong aliasing can be eliminated, where necessary, by removing one or more words from one or more word tables for the candidate languages.

This illustrative embodiment of the invention assumes that 5 letters are sufficient for recognition; the extension to longer words is obvious. The 10 tables required for words of 5 letters can be thought of as arranged in a tableau as:

| T(1,2) | T(2,3) | T(3,4) | T(4,5) |
|--------|--------|--------|--------|
| T(1,3) | T(2,4) | T(3,5) |        |
| T(1,4) | T(2,5) |        |        |
| T(1,5) |        |        |        |

Figure 4:
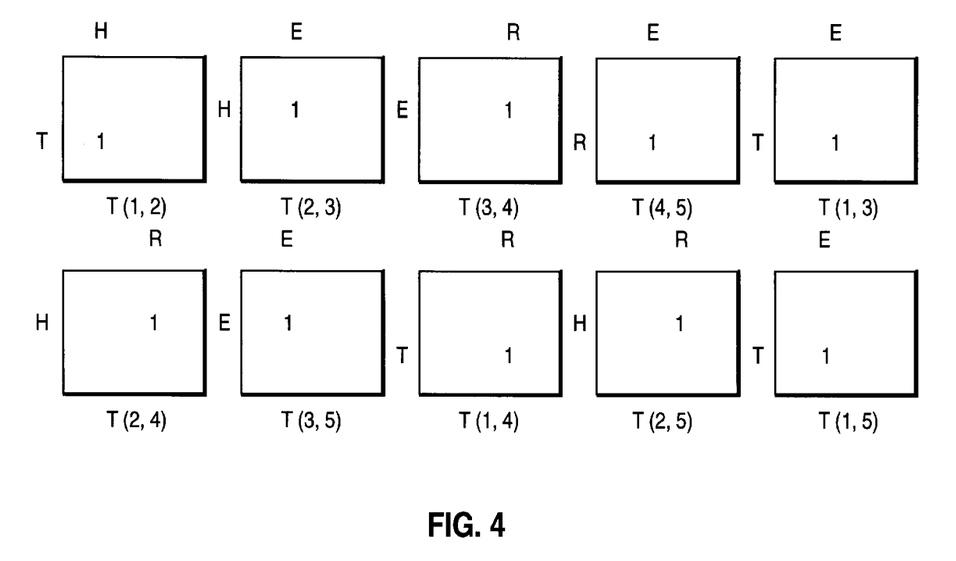
FIG. 4 is a diagram of a tableau of word tables for storing five letter words.

To initialize the word tables for English, FIG. 4 shows the invention using "there" as one of the high frequency words that will be used to discriminate among the different languages. Then, in table T(1,2) set the bit at the intersection of "t" and "h" to 1. In table T(2,3) set the bit at the intersection of "h" and "e" to 1. Continue so that in table T(3,4) the bit at the intersection of "e" and "r" is equal to 1, and in table T(4,5) the bit at the intersection of "r" and "e" is equal to 1. This completes the initialization of the tables in the first row. Continue by setting the bit at the intersection of "t" and "e" in T(1,3) to a 1, and the bit at the intersection of "h" and "r" in table T(2,4) to 1. The process continues by setting the bit at "e", "e" in table T(3,5) to 1. Continue by setting the bit at the intersection of "t" and "r" in T(1,4) to a 1 and the bit at "h", "e" T(2,5) to a 1. Finally, set the bit at "t" "e" in table T(1,5) to 1. In general, if a word consists of letters, l(1) through l(5), in order, then the letter pair l(1)l(2) is stored in T(1,2) and so on.

At this point, the word "there" has been stored in the word tables for 5 letter words as a set of 1 bits where the bits selected for setting represent all the ordered "letter pairs" of the word. That is, the tables of the first row contain, "th," "he," "er," and "re," while the tables in the second row contain "te," "hr," and "ee." The third row tables contain "tr" and "he" and the table in the last row contains "te."

This method of storing the words provides enough relationships among the letters of the words so that only the words stored in the tables will verify. So long as the tables remain sparsely populated, and they will using the method disclosed, the only 5 letter words that will verify correctly in the tables are those that have been entered for the given language. A discussion below provides guidelines for sparsely populated word tables.

If "then," "stem," and "shin" were stored in the 4 letter word tables, the misspelling in an English document of "shen" would also verify and would be an example of weak aliasing. Errors which will occur due to misspellings do not occur often enough to be a concern. In fact, this method works as there are relatively few words required to determine the natural language in which a document is written. Therefore, the misspelling exposure is to a small set of words in the language. If the tables were to become overpopulated, i.e. many words in the word tables, the discrimination accuracy would decline. After the word tables have been created for each candidate language for which determination is desired, the process described above, where a sequence of words is read, one at a time, from an input document having its language or genre identified is performed. Each word read is split into the appropriate letter pairs, as defined by the tables for the various word lengths, and the bit stored at the intersection of each of the pairs of letters from each table is read out of the tables. This is done for each of the candidate languages. For a 5 letter word in the document, this results in a set of 10 bits which may represent a word from none to all of the languages under consideration. The 10 bits are ANDed together and, if the result is 1 for a given language, that word is represented in the tables for that language. Similarly, if the ANDing of the 10 bits yields a 0, the input word is not stored in the tables for that language.

In an alternative embodiment, rather than ANDing all of the bits together, the process simply counts the number of hits where letter pairs from the word from the document match letter pairs stored in the word tables. While the alternative embodiment may not offer as much discrimination as ANDing the bits together, because certain letter pairs will occur in higher frequency in different languages, the language of the document can be successfully identified. For example, "ij" is a very common letter pair in Dutch occurring in many different Dutch words.

The process of fetching a word from the document in question, determining its value from the tables for the given candidate language and adding it to the running total is repeated until one of the following halting conditions is achieved: First, the process may stop when all the words in the document have been examined. Second, stop when enough, of the words, i.e. roughly 100 or so in the document have been examined. Third, the process may stop counting when the value of one of the running totals in the accumulator has exceeded a preset threshold. Fourth, the process may halt when the counters diverge sufficiently, e.g., the difference between the largest and the second largest of the running totals has exceeded a preset threshold. Regardless of which of the halting rules has been satisfied, the largest language total is selected to indicate the most probable language for the document. Successful identification may also be dependent on reaching a certain number of matches with one or more of the word tables. In other words, the identification process is deemed indeterminate unless a certain number of hits has registered. While it may seem surprising that the words for a candidate language may be stored together as sets of bits, given the possibility for aliasing with different permutations of letters, the applicants have determined that the storing method of the invention works well so long as the sparsely populated requirement is met.

In this invention, the word tables are stored in such a way that the amount of storage required is fixed, the access time can be made very small, especially for hardware implementations. The method of storage is believed to apply more broadly than this specific application.

Aliasing

All the tables for the most frequent 40% of American English were constructed using all of the words stored in four letter tables. The applicants note that this is a worst case as alternate embodiment use separate tableaus for storing words of different lengths, thus making the tables even more sparsely populated. Tables 2 and 3 are shown below. The columns in Table 2 contain the letter pairs which would result in bits being set in the associated table, where T12 is the table of the first and second letters, T23 is the second and third and so on. A "*" is used to indicate a blank character.

All words of 1–5 characters have been entered into the tables. Partial or truncated words are used for common words over five letters. A single table set rather than a set of tables for each word length is used. This is a simpler system than described above for the preferred embodiment, but the data gathered demonstrates its feasibility; the method originally disclosed will have even better behavior, i.e. fewer aliases.

TABLE 2

| T12 | T23 | T34 | T13 | T24 | T14 |
|-----|-----|-----|-----|-----|-----|
| a*  | **  | **  | a*  | **  | a*  |
| al  | ad  | at  | ad  | a*  | b*  |
| an  | as  | d*  | ae  | ae  | bn  |
| ar  | av  | e*  | al  | e*  | f*  |
| as  | e*  | ei  | b*  | ee  | fm  |
| at  | ee  | en  | be  | en  | h*  |
| be  | er  | er  | bt  | f*  | he  |
| bu  | f*  | ey  | fo  | h*  | i*  |
| by  | ha  | ic  | fr  | hc  | n*  |
| fo  | he  | is  | h*  | hi  | o*  |
| fr  | hi  | l*  | hd  | hn  | s*  |
| ha  | ho  | ll  | hm  | hr  | t*  |
| he  | il  | m*  | hr  | hs  | ti  |
| hi  | im  | o*  | hs  | ht  | tr  |
| i*  | is  | om  | hv  | hy  | ts  |
| in  | it  | r*  | i*  | i*  | tt  |
| is  | ll  | re  | nt  | ih  | ty  |
| it  | n*  | s*  | o*  | il  | w*  |
| no  | nd  | t*  | oe  | l*  | wc  |
| of  | ne  | th  | se  | n*  | we  |
| on  | o*  | u*  | t*  | o*  | wh  |
| or  | or  | ul  | ta  | ol  | wl  |
| sh  | ot  | ve  | te  | r*  | wn  |
| th  | ou  |     | ti  | rm  | y*  |
| to  | r*  |     | w*  | s*  |     |
| wa  | re  |     | we  | t*  |     |
| we  | ro  |     | wi  | u*  |     |
| wh  | s*  |     | wl  | y*  |     |
| wi  | t*  |     | wo  |     |     |

TABLE 2-continued

| T12 | T23 | T34 | T13 | T24 | T14 |
|-----|-----|-----|-----|-----|-----|
| wo  | ut  |     | wr  |     |     |
| yo  | y*  |     | ws  |     |     |
|     |     |     | wt  |     |     |
|     |     |     | wu  |     |     |
|     |     |     | yu  |     |     |

This set of data in Table 2 results from loading the six tables for four character words with the top 40% of American English words. There are 47 such words. Following the loading, a total of 63 "words", i.e. character strings, will verify. The words verifying will include, in addition to the 47 entered, the following words, listed under the heading, ALIAS, below in Table 3. If the three words listed at the top of the remaining columns are dropped from the input, then the number of aliases is reduced as shown in Table 3.

|  | Dropping this word leaves | | |
|---|---|---|---|
| ALIAS | BEEN | WOULD | ARE |
| ane | ane | ane |  |
| ar  | ar  | ar  |  |
| bee |     |     |  |
| fro | fro | fro | fro |
| ore | ore | ore |  |
| wee |     |     |  |
| ween|     |     |  |
| wer | wer | wer | wer |
| whe | whe | whe | whe |
| wil | wil | wil | wil |
| wis | wis | wis | wis |
| wit | wit | wit | wit |
| wo  | wo  |     |  |
| wor | wor |     |  |
| wot | wot |     |  |
| wou | wou |     |  |

What this table shows is that with a simple adjustment of the words stored in the word tables, most of the weak aliases can be eliminated, without giving up on the use of partial words or a single set of tables. The stronger conditions will continue to hold, namely using the full words and the larger table sets will be better. Here's why.

The five letter word "would" does not get loaded into the four character tables, in the preferred embodiment which has a separate set of five letter tables. Therefore, the aliases beginning "wo" will not occur. The three letter word "are" is the word giving rise to the aliases "ane," "ar," and "ore." Again, under the full set of tables, the three letter word "are" will not be mixed with the two and four letter words, so this situation would not arise. Finally, the word "been" is causing the aliases "bee," "wee," and "ween." While each of these are really English words, and therefore week aliases, they can nonetheless be eliminated by dropping "been." This demonstrates that the weak aliases produced are often words themselves. The applicants have observed that the common words in a language are made up of common letter patterns in that language. These common letter patterns tend to combine to make other words in that language.

The dropping of a few of the words in the top 40% of the language is not significant. From the data above, dropping "been" results in coverage of 39.8% (down 0.2%), dropping "would" takes the coverage down another 0.3% and dropping "are" brings the coverage to 39.1%. The coverage can be increased, if desired, by adding a few additional words to the 44 remaining words.

The remaining aliases, "fro", "wer", "whe", "wil", "wis" and "wit" result from using a single set of tables and cannot be eliminated without removing a frequently occurring word, e.g., "from" or two words, e.g., "with" and "will". There are several conclusions to be drawn from this analysis.

First, partial words in the four characters case and a single set of tables is workable. With the exception of "wo" none of the weak aliases is also a common strong alias in any of the Germanic languages: German, Danish or Dutch. Note that the applicants do not conclude that none of the aliases occur in any other language; only that they do not occur in the top 40% in a particular set of candidate languages. Hence, there is very little risk from strong aliasing the Germanic languages into English. Other sets of candidate language may require that other common words be dropped from the word tables to minimize strong aliasing. Using the full table set for all word lengths eliminates much of the aliasing. Further, even if some strong aliasing did occur as long as it was relatively infrequent, the invention will adequately identify the language of the document.

Second, this data allows one to conclude that, if using 27 by 27 bit tables, i.e. to allow for the use of the blank with the 26 letters), 54 1-bits per table is sparse enough. The most populous table (T13) has 54 letter pairs in it and the performance is acceptable. Setting 54 1-bits out of 27×27 or 729 yields a percent set of 7.4%. It is safe to say that the system will work satisfactorily if 7.5% or fewer of the bits in a particular table are set. In fact, a safe working limit is likely to be several percent higher.

Third, based on these results with the Germanic languages, it is unlikely that strong aliasing will ever be a problem provided that the tables are kept sparse. As can be seen from the weak aliases, the likelihood is that any aliasing that occurs will produce "words" whose characteristics more nearly match those of the given language than a different language. In retrospect, this result is to be expected since the single letter and digraph frequencies are known to vary by language. The extension to letter groups composed of non-adjacent letters is still driven by the underlying single letter and digraphic frequencies. In short, strong aliasing is an unlikely possibility if high frequency words are used in the word tables.

As shown below, a second study using the comparable word tables and verification lists was conducted for French. The results are better than English due chiefly to the more limited use of letters and letter combinations within the top 40% of French words as compared to English. English, especially American English, has drawn on many more language sources for its words historically than has French; this broader draw causes a greater dispersion in letter combinations than many other languages.

A second, and somewhat less important reason for the reduced aliasing is the larger French alphabet. Although there are still only 26 letters used (and "k" and "z" words are essentially all borrowed from other languages), there are four separate accent marks used with different letters giving an effective symbol set of 33 letters.

In any case, as shown below in Table 4, the number of aliases is only 4, although two of these are strong aliases, "das" with German and "el" with Spanish and Portuguese. "Da" would also likely be a strong alias with Russian. These are easily eliminated by dropping the indicated words in Table 5.

TABLE 4

| WORDS | T12 | T23 | T34 | T13 | T24 | T14 |
|---|---|---|---|---|---|---|
| a | $* | ** | ** | $* | ** | $* |
| a* | a* | 'a | 'a | a* | 'a | c* |
| au | au | a* | e* | c* | a* | d* |
| c' | c' | an | i* | d* | as | ds |
| ce | ce | as | le | dn | e* | e* |
| d' | d' | e* | ns | ds | l* | ee |
| dans | da | es | s* | e* | le | i* |
| de | de | l* | t* | el | ls | j* |
| des | du | ll | ur | et | n* | l* |
| du | el | lu | us | i* | or | n* |
| elle | en | n* |  | j* | os | ns |
| en | es | ne |  | l* | s* | o* |
| est | et | ou |  | ls | t* | p* |
| et | il | st |  | n* | u* | pr |
| il | je | t* |  | nu |  | ps |
| je | l' | u* |  | o* |  | q* |
| l' | la | u' |  | ps |  | s* |
| la | le | ue |  | pu |  | u* |
| le | n' | ui |  | q' |  | vs |
| les | ne |  |  | qe |  |  |
| n' | no |  |  | qi |  |  |
| ne | on |  |  | s* |  |  |
| nous | pa |  |  | u* |  |  |
| on | pl |  |  | ue |  |  |
| pas | po |  |  | vu |  |  |
| plus | qu |  |  |  |  |  |
| pour | se |  |  |  |  |  |
| qu' | un |  |  |  |  |  |
| que | vo |  |  |  |  |  |
| qui |  |  |  |  |  |  |
| se |  |  |  |  |  |  |
| un |  |  |  |  |  |  |
| une |  |  |  |  |  |  |
| vous |  |  |  |  |  |  |

Top 40% of French Words
\* = blank
$ = a with accent

Dropping the indicated words in Table 5 below would reduce the coverage for French by about 4.9% to 36.1%; this is a large enough percentage that other common words should be selected to make the language coverage equivalent in the word tables. Exactly 40% coverage would be attained if words whose total usage count was 8589 were added. Candidates for such additions are "par" (count—2491), "me" (2325), "mais" (2251), "sur" (2112). "tout" (1772) and so on. However, the word "si" whose count is 1782 would be a poor choice because it is a strong alias from Spanish. A quick check shows that adding "par" and "me" causes no additional aliases and increases the coverage to 38%. Again, the applicants conclude that aliasing is not a problem for French. Further, it can be reduced or eliminated by selection of common words should there exist a language in which it is a problem.

TABLE 5

| | Dropping this word leaves | | |
|---|---|---|---|
| ALIAS | DANS | ELLE | POUR |
| da |  |  |  |
| das |  |  |  |
| el | el |  |  |
| pous | pous | pous |  |

The word storage method as described above can be used for other applications than language identification. For example, the tables may be loaded as described with license plates that have warrants against them. A handheld calculator for the police would allow an officer to enter a license plate, e.g. "TRC-04B", and if he got a match, the car has a warrant against it. Passport watching could be conducted similarly by customs.

The invention may also be used in the following situation, 25 people are to have access to a shared resource such as like a printer room, but for security reasons they should not share the same password i.e. cipher key. Give each person his own 6 (or more) alphabetic/numeric key and store each one in the tables. Any valid key will verify and allow access to the resource. One can easily count, track who is using the resource. The users never have to share keys. The keys might also be encoded on a magnetic strip for "badge access" that again gives each person his own unique key but requires a fixed amount of storage.

Lastly, the invention can be used in the crypto application of filtering the output of brute force attacks. Suppose a 500 character cryptogram is repeatedly "deciphered" with trial keys. Pass the results through this device loaded with the "naval" geure, say. "ship" "ocean" etc. If the count is high, give the trial decipherment to a person to review. The key or a close match may have been found. Else, reject and try the next key.

Specialized Hardware

This section describes a means to identify the language of a computer document in hardware such that processing time can be minimized. That is, the key portion of the process can be made to execute with true parallelism in hardware or on any sufficiently parallel processor implementation. Any reasonable firmware or software implementation of the word table storage method described above will also be very fast and require a small amount of storage for data.

This invention provides an internal representation of the word tables as described above in such a way that the determination that a given input word is, or is not, contained in one of the word tables can be done in one machine cycle per word. The representation of the words makes possible speeds which can not be obtained in any other way. Furthermore, the invention can be "pipe-lined" so that not only are the input words processed in parallel for a plurality of languages, there would be multiple words at the different stages of processing at any point in time.

In summary, the invention will determine the natural language from among a preselected set of candidate languages in which a given body of text may be written. A set of word statistics for each of the languages under consideration must be obtained and word tables prepared. As discussed above, for essentially all the interesting cases, the statistics already exist. The method then consists of obtaining words, one at a time from the document, determining to which languages they could belong and, for the document as a whole, selecting as a result the language with the most matches. The value of this hardware embodiment is the performance improvement over a software or firmware implementation and the simplification of the identification process. The improvement results from the internal representation of the word storage tables and the supporting hardware which allow the process to run in parallel and pipelined.

This invention differs from the prior art in at least two important ways. First, it uses the novel data representation scheme described above that permits very fast and parallel verification that a word is, or is not, part of several languages at the same time. Second, the underlying process is simplified so that the accumulation of values is based on the actual occurrence (or not) of the dictionary words. In this regard, the process and hardware implementation uses simple counting rather than a normalized, weighted value for the words in the word tables.

In this illustrative embodiment, a fully parallel hardware implementation is described. Differences between parallel and serial implementations are discussed below. A fully parallel implementation assuming 8 languages will be described; extension to more languages is obvious, as is a smaller implementation for fewer language. For best performance, there will be one set of hardware for each language; this permits a single pass through the subject text and determination for all languages during that single pass. If the number of languages exceeds the hardware availability, additional passes through the document will be needed along with hardware initialization.

Figure 5:
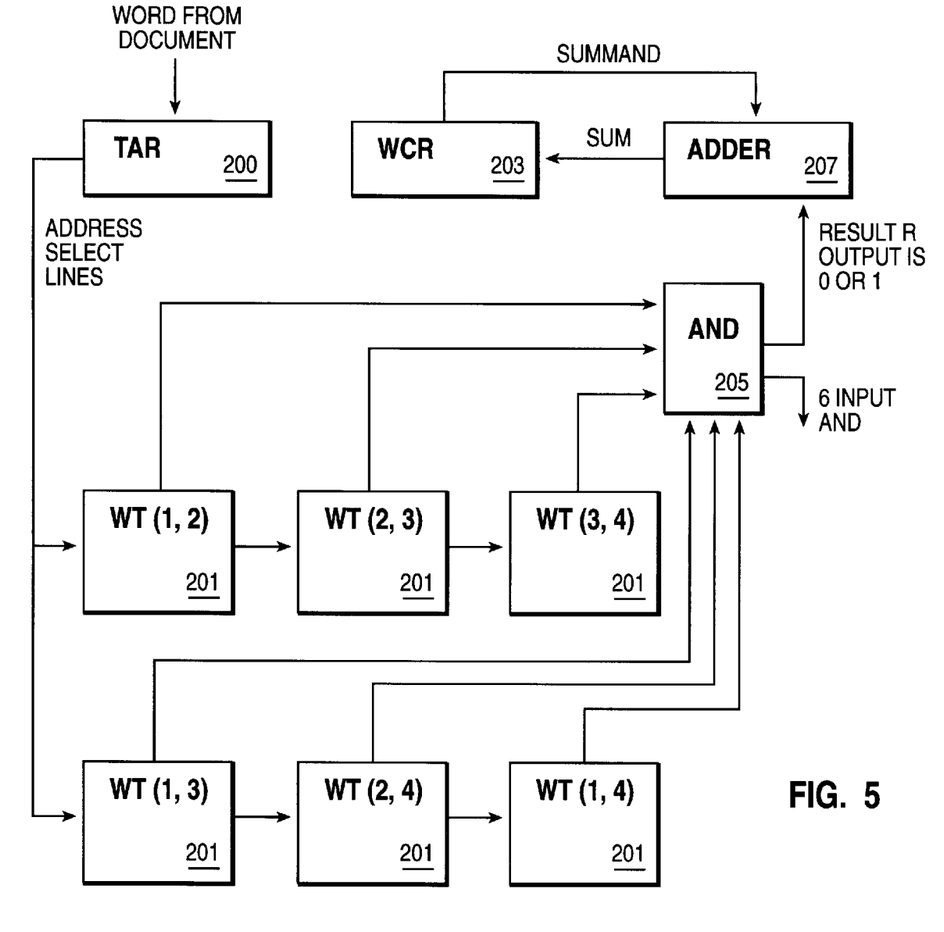
FIG. 5 is a hardware block diagram for a fully parallel implementation.

The basic hardware consists of a set of Table Access Registers (TAR's) 200, one for each of the languages that will be verified in parallel, a set of word tables 20/(WST) for each language and a Word Count Register (WCR) 203 for each language. Supporting hardware includes AND's 205 and ADDER's 207. The basic structure for a single language is depicted in FIG. 5.

Figure 6:
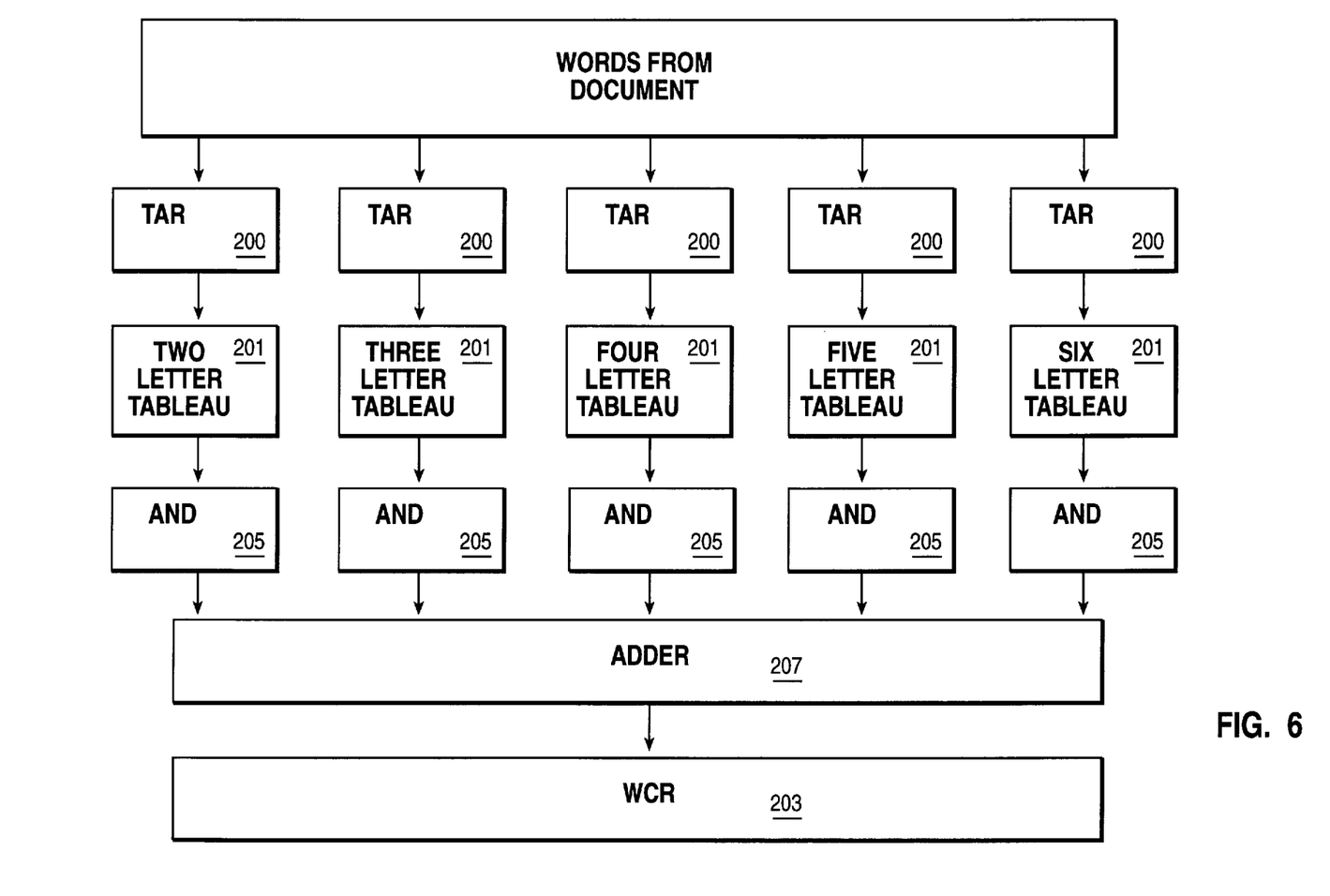
FIG. 6 is a hardware block diagram for a plurality of tableau for storing different length words.

The hardware shown is for a single language with word table for a word length of four letters. For other word lengths as described above in the preferred embodiment, larger and smaller word table tableaus are required for 2, 3, 5 and 6 letter words. For eight candidate languages, each of the five word tableaus for different length words would be replicated. Table 6 below shows the hardware required by language and word length. FIG. 6 shows another hardware block diagram of the hardware required for a single language where the tableaus of tables are simplified in illustration.

TABLE 6

Hardware Requirements for Fully Parallel Implementation

| Element | Requirement | For 8 Languages |
|---------|-------------|-----------------|
| WST | 35 per language (2–6 ltrs) | 280 |
| TAR | 1 per word length & language | 40 |
| AND | 1 per word length & language | 40 |
| ADDER | 1 per language | 8 |
| WCR | 1 per language | 8 |
| CMPTR | 1 per unit | 1 |

Figure 7:
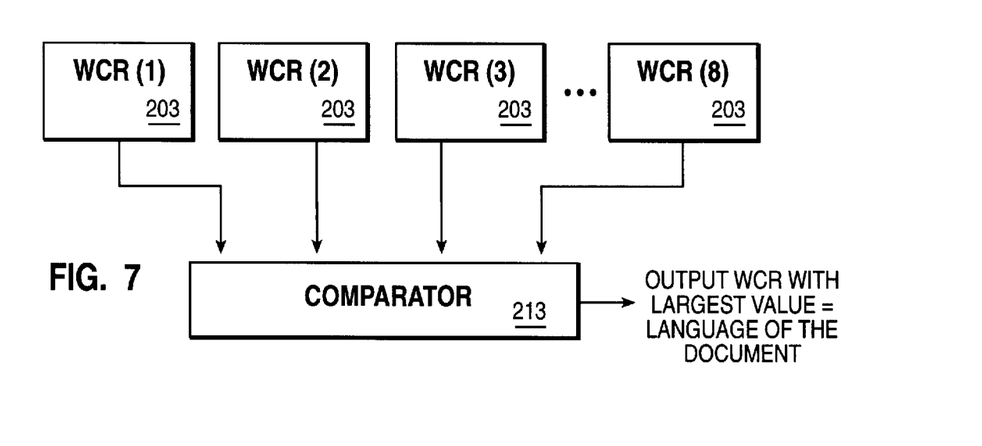
FIG. 7 is a hardware block diagram of a comparator for identifying the language of a document.

One set of the hardware shown FIG. 7 is needed for the final language selection. This is a comparator 213 that is used to determine which of the Word Count Registers 203 (WCR's) has the largest value. The comparator for comparing the values of the various registers, the length determinator for determining the length of words from the documents and the truncator for truncating words from the documents in the partial word embodiment are all available as standard macros in most hardware design languages. The particular number of AND gates, or gates and so forth will vary with the hardware design language and the number of inputs and outputs for the particular embodiment.

The words are preferably stored in the hardware embodiment as described above in the Word Storage Table section. The word tables could also use content addressable memory. This is much more expensive, however, and generally the content addressable memory would have to be enlarged to add more words.

The basic unit of word storage is an n×n bit table, where each bit represents a given letter pair in one of the languages under consideration. As discussed above, to store a word of 5 letters requires the use of 10 such tables. The tables can be used for all word lengths from 2 to 5 letters, but for speed, each given word length will be assigned its own set of tables.

From the point of view of the device and algorithms, both the words to be stored and those fetched from the document may be truncated to the same length words. The fact of the truncation does not otherwise impact the process. As detailed below, in the discussion about "partial words", truncating words actually improves discrimination.

Storing the words as sets of bits representing the ordered "letter paris" of a word provides enough relationships among the letters of the words so there will be a minimum of aliasing during word verification. So long as the table remains sparsely populated, as discussed above, for all practical purposes, the only 5 letter words that will verify correctly in the tables are those that have been entered for the given language. If the tables are allowed to become overpopulated, the discrimination accuracy would decline.

After the tables have been created for each language for which determination is desired, the process continues by reading an appropriately delimited character string word, from the document being considered. From the point of view of the device and algorithms, simply truncating both the words to be stored and those fetched from the document to the same length works. The fact of the truncation is not relevant other than the discussion about "partial words" which actually improve discrimination. If the word length matches one of the lengths for which the tables have been built, i.e. typically be 2 to 6 characters but can be varied, the word or character string is loaded into the appropriate length special purpose register, e.g., a table access register, or TAR, 200 for accessing the word tables. The TAR's are constructed so that each byte of the register provides addressing to several of the tables in the associated tableau 201. For example, the first byte of the 4 character TAR, that is, the TAR for 4 byte/character words, provides the row address for tableau tables T(1,2), T(1,3), and T(1,4). Correspondingly, the second byte of the TAR for 4 character words provides the row addressing for T(2,3) and T(2,4) and column addressing for T(1,2).

The remaining bytes of the TAR provide the other addressing required. Table 7 below shows the addressing for the entire 4 byte TAR, by TAR byte:

TABLE 7

TAR Addressing Scheme

| TAR Byte | 1 | 2 | 3 | 4 |
|---|---|---|---|---|
| ROWS | T(1,2) T(1,3) T(1,4) | T(2,3) T(2,4) | T(3,4) | None |
| COLS | none | T(1,2) | T(2,3) T(1,3) | T(3,4) T(2,4) T(1,4) |

In an alternative embodiment, a single TAR will suffice per language; the unused addressing lines are not a problem, so that a 4 byte word in a 6 byte TAR is logically fine. However, this will require more fan out for the address lines, so in the preferred embodiment different length registers are disclosed. If the technology can drive a large fan out, then the number of TAR's can be reduced.

Using the TAR addresses for the 4 bytes, the following logical expression for a result R is computed (where AND is the logical AND operation):

R=T(1,2) AND T(2,3) AND T(3,4) AND T(1,3) AND T(2,4) AND T(1,4)

If the result R, is a one, then the four characters currently held in the 4 byte TAR are recognized as a word in the given language. If the result R is a zero, then the characters are not recognized as a word in this language. To maintain a running total of the number of words recognized in the given language, it is only necessary to add R to the current sum for that language. If the contents of the TAR were not recognized as a word in the language, then R is zero and adding it to the running total for the language will not increase the total for that language.

As described above, this process of fetching a word from the document in question, determining its value and adding it to the running total is repeated until one of the halting conditions is achieved. First, all the words in the document have been examined. Second, enough of the words in the document have been examined. Third, the value of one of the running totals has exceeded a preset threshold. Fourth, the difference or ratio between the largest and the second largest of the running totals has exceeded a preset threshold. Regardless of which of the halting rules has been satisfied, the largest language total is selected to indicate the most probable language for the document. If two or more totals are identical, then exact determination may not be possible for this document; there are recovery actions that can be taken. These are described in the earlier work and not repeated here.

To give a precise definition to the running total, which is called the "word count" and is computed separately for each of the candidate languages, it is the sum over all words fetched of the respective R values. That is, WORDCOUNT=(i=1) SIGMA (i=n) R(i).

The word count for each language is accumulated in a separate register for that language in a fully parallel implementation. When all the words have been examined, the Comparator is used to determine which of the languages has the largest count; that language is then selected as the most likely natural language of the document.

The processing for the determination of the language of a body of text has the following steps:

Step 1: A word from the document under consideration, whose length is equal to or less than the largest that will fit into a TAR, is selected and loaded into the appropriate length TAR. In the partial word embodiment the words may be truncated to the length in use.

Step 2: The letters of the word in the TAR are used in the combinations described to access a single bit in each of the appropriate word tables for all the languages under consideration.

Step 3: The bit outputs of the accessed word tables are AND'd together to produce a result bit, R for each of the languages.

Step 4: The sum of the appropriate language WCR is added to the result bit for that language and stored in the WCR.

Step 5: When all the words have been processed, or another halting condition is reached, the contents of WCR's are presented to the Comparator which determines the largest value and signals the corresponding language as the most likely language of the document.

There are several different ways for ending the processing and determining which language should be signaled. These were discussed under halting conditions above. Note that slightly different hardware is needed for detecting the threshold conditions, however, the differences are obvious and not discussed further. For example, a maximum value in one of the accumulators requires a series of comparisons and comparison hardware. When using a threshold one value exceeds all of other by a fixed amount requires an on-going monitor which is easily provided by triggering an a "1" bit at a particular location in a register.

Note that in general, the tables will need to be larger than 26×26 since a number of languages have more than 26 letters. Languages with very large "alphabets" such as Japanese are best treated by using a different pattern of word table wherein each language has a single table of less than 256×256 bits and each ideogram or other language symbol such as katakana is assigned separately.

In this case, the language can be thought to be made of only 2 "character" words, where the first byte of the DBCS representation is the first "letter" and the second byte is the "second" letter. Then a single table "tableau", is used since all words are two letters and the hardware is significantly reduced. At this time, there are only 4 languages that require this alteration, although all are very important. They are Japanese, Korean and the two variants of Chinese, the PRC variant (modern) and the ROC variant (classical). Holding the bit requirements at 65,536 across all languages leads to a table size of 43 characters for alphabetic language, and this is sufficient for both the alphabetic and ideographic languages.

This invention has general application to certain cryptographic problems. Briefly, the invention can be used to filter the output of key generation attacks, for message sorting in traffic analysis, for placing a "watch" on E-mail to detect occurrences of particular content and similarly, on telephony, given a speech-to-text front end.

There are a number of alternative embodiments to the hardware described in this section. Some of these are identical to those discussed above such as eliminating common words from the word tables of different candidate languages to reduce aliasing. Other modifications to those that are particular to this hardware embodiment are discussed below.

A reduced-cost hardware implementation is possible by providing for multiple passes through the document and using a single set of hardware. Each pass results in the hardware WCR producing a single number that represents the value of the language that was loaded into the word storage tables. A reset is needed to assure that the word tables are cleared before reload for a new candidate language. No comparator is required in the hardware. This approach sacrifices speed for hardware cost and requires more complicated software, i.e. reinitializing and comparing software.

A reduced-cost hardware implementation is also possible using just a single set of word tables, rather than a tableau for the different word lengths. Again, this will force multiple passes through the document and sacrifices speed for cost. In addition to loading the word tables for each language, the word tables may be loaded for each of the different word lengths within each language. Alternatively, a single tableau can be used for all word lengths if it is sparsely populated.

The word tables can be replaced by content addressable memory that returns a 1 if the word is in one of the memory locations and a zero (0) if the word does not match the contents of any location. This embodiment would not use the TARs but would instead use a logically equivalent comparand register. Although this is a logically equivalent implementation, it will be slower as the CAM cycle time to obtain the comparison result is longer. Content addressable memory is also much more expensive than required for the disclosed device. However, TAR fan out can be avoided by using content addressable memory and it may be possible to load all languages into the memory at the same time. This would be faster than the serial implementation, but not so fast as the parallel one.

Partial Word Embodiment

The applicants have shown several ways in which the natural language of a body of text can be determined using very short word lists consisting of the most frequently used words of a natural language. In one preferred embodiment, it is not necessary to use entire words, but word fragments, which are akin to word roots or stems, will work equally well. Such partial or truncated words are useful in that they eliminate the programming problems that are often associated with variable length string processing by allowing for the use of fixed length four or fewer characters fields whose natural length of 32 bits are handled particularly well by most stored program digital processing systems.

Further advantages are derived from the use of registers to contain fully the word fragments so that they may typically be handled in a single register-to-register or register-to-storage cycle. These advantages include faster execution of the programs, better alignment of the data area within the memory and caches of the machines, and reduced bus traffic attributable to greater-than-bus-width data operands.

Similarly, there may be an improvement in the actual identification statistics associated with the underlying algorithms since more words will now be found to match the short, partial word lists. In a great many cases, it was found that the separation of the languages is increased, regardless of the algorithm used, either counting or weights, because more of the words in the language are recognized.

To cite a single example, consider the American English word list which ranks the word "some" among the 75 most frequently used words. "Some" occurs in American English with a frequency of occurrence of 0.15943%, or about 159 times in every 100,000 words. If however, only words of from 1 to 4 characters are processed and the first four characters of all longer words, then each of the following words will also be counted as "some" "someone," "sometime," "something," "somewhere," "somewhat," and "somehow." This will improve the count and weight methods for American English for a document which is written in English and do so without increasing the number of words that must be carried in the word list. Similar high frequency American English words which display this behavior include, "with", "have", "were", "when", "will", "more", "what" and so forth. For the highly declined languages like French, and Italian, the effect is more pronounced. The Semitic languages which include Hebrew and Arabic and which make far more extensive use of roots and stems are likely to work even better.

There is nothing magic about the use of four character words, although at present this length seems most natural.

Experiments have shown that after about 100 to 200 words are read from a document being examined to determine its natural language, the identification of the correct language is given by the largest sum in the accumulators for the candidate languages. It is preferable that several hundred words be read from a document, unless it is a very short document, to conclude that the language identification is assured with a high degree of confidence. For short documents, the language assurance is less, but generally is sufficient.

As an aside, cryptographers have known for a long time that common words can provide an opponent with an entry into a code or cipher. In certain situation then, messages are encoded or enciphered avoiding the common words. This fact provides an independent confirmation of the usefulness of common words in the determination of the language of a document.

It can be argued that uncommon words are actually a better discriminator among languages and while true, it is not a particularity useful observation. For example, "undoubtedly" occurs only (so far as is known to the inventors) in English, and hence may be taken as an absolute indication that a document containing it is written in English. However, the word "undoubtedly" occurs so infrequently, as to be of no value in discriminating among languages. Using large tables of uncommon words will increase discrimination (either alone or in combination with common words). Uncommon word tables for languages of interest are intended to be included in the concept of this invention, so that if all the words in a given document are found in a table of uncommon words of one language, L, it is assured that the document is written in language L.

while the invention has been shown and described with reference to particular embodiments thereof, it will be understood by those skilled in the art that the foregoing and other changes in form and detail may be made therein without departing from the spirit and scope of the invention.

We claim:

1. A method for identifying the language in which a document is written, comprising the steps of:
   reading a plurality of words from a document into a computer memory;
   truncating words within the plurality of words which exceed a predetermined length to produce a set of short and truncated words;
   comparing the set of short and truncated words to words in a plurality of word tables, each word table associated with and containing a selection of most frequently used words in a respective candidate language, wherein the most frequently used words which exceed the predetermined length are truncated in the word tables;
   accumulating a respective count for each candidate language each time one of the set of short and truncated words from the document matches a word in a word table associated with the candidate language; and
   identifying the language of the document as the language associated with the count having the highest value.

2. The method as recited in claim 1 further comprising the steps of:
   storing a frequency of occurrence of each word in the respective candidate language in each word table;
   using the frequency of occurences to weight the respective counts for each candidate language.

3. The method as recited in claim 1 further comprising the steps of:
   accumulating a respective weighted count for each candidate language equivalent to an aggregate frequency of occurrence for each time one of the set of short and truncated words from the document matches a word in a word table associated with the candidate language;
   determining a number of the short and truncated words compared to the word tables; and
   using the respective weighted count to identify the language of the document until the number of short and truncated words exceeds a predetermined number.

4. The method as recited in claim 1 further comprising the step of selecting most frequently used words for the word tables to reduce strong aliasing between candidate languages.

5. The method as recited in claim 1 wherein a first truncated word is a weak alias of a first short word in a word table so that the first truncated word matches the first short word in the comparing step.

6. The method as recited in claim 1 wherein a plurality of tableaus of word tables is associated with each candidate language each tableau of word tables for comparing words of a respective length and the method further comprises the steps of:
   determining the length of each word in the plurality of words;
   comparing words of a respective length in the set of short and truncated words with the tableaus for each respective candidate language for words of the respective length;
   wherein the truncated words are compared to the tableaus for words of a longest respective length.

7. The method as recited in claim 1 wherein the words are stored in the tables as bits set for a presence of an ordered letter pair in one of the most frequently used words in the respective candidate language.

8. A method for identifying the language in which a document is written, comprising the steps of:
   reading a plurality of words from a document;
   truncating words within the plurality of words which exceed a predetermined length to produce a set of short and truncated words;
   comparing the set of short and truncated words to words in a plurality of word tables, each word table associated with and containing a selection of most frequently used words in a respective candidate language, wherein the most frequently used words which exceed the predetermined length are truncated in the word tables;
   accumulating a respective weighted count for each candidate language each time one of the set of short and truncated words from the document matches a word in a word table associated with the candidate language; and
   identifying the language of the document as the language associated with the weighted count having the highest value.

9. The method as recited in claim 8 wherein a weight added to the respective weighted count is proportionate to a frequency of occurrence for the matched word in the respective candidate language.

10. A system including processor and memory for identifying the language in which a document is written comprising:
    means for reading a plurality of words from a document into the memory;
    means for determining a length of each word in the plurality of words;
    means for truncating words within the plurality of words which exceed a predetermined length to produce a set of short and truncated words;
    means for comparing the set of short and truncated words to words in a plurality of word tables, each word table associated with and containing a selection of most frequently used words in a respective candidate language;
    means for accumulating a respective count for each candidate language each time one of the set of short and truncated words from the document matches a word in a word table associated with the candidate language; and
    means for identifying the language of the document as the language associated with the count having the highest value.

11. The system as recited in claim 10, wherein the most frequently used words which exceed the predetermined length are truncated in the word tables.

12. The system as recited in claim 10 further comprising the step of selecting most frequently used words for the word tables to reduce strong aliasing between candidate languages.

13. The system as recited in claim 10 wherein a first truncated word is a weak alias of a first short word in a word table so that the first truncated word matches the first short word in the comparing step.

14. The system as recited in claim 11 wherein a first truncated word is a weak alias of a second truncated word in a word table so that the first truncated word matches the second truncated word in the comparing step.

15. The system as recited in claim 10 further comprising:

a plurality of tableaus of word tables each associated with each candidate language, each tableau of word tables for comparing words of a respective length;

wherein the comparing means compares words of a first respective length in the set of short and truncated words with the tableaus for each respective candidate language for words of the first respective length.

16. A computer program product on a computer readable medium for identifying the language in which a document is written comprising:

means for determining a length of each word in a plurality of words from the document;

means for truncating words within the plurality of words which exceed a predetermined length to produce a set of short and truncated words;

means for comparing the set of short and truncated words to words in a plurality of word tables, each word table associated with and containing a selection of most frequently used words in a respective candidate language;

means for accumulating a respective count for each candidate language each time one of the set of short and truncated words from the document matches a word in a word table associated with the candidate language; and means for identifying the language of the document as the language associated with the count having the highest value.

17. The product as recited in claim 16, wherein the most frequently used words which exceed the predetermined length are truncated in the word tables.

18. The product as recited in claim 16 further comprising means for weighting the respective counts for each candidate language according to frequencies of occurrence of the most frequently used words in each respective candidate language to produce weighted counts wherein the weighted counts can be used by the identifying means.

\* \* \* \* \*